United States Patent
Jao et al.

(10) Patent No.: US 11,126,073 B2
(45) Date of Patent: Sep. 21, 2021

(54) ILLUMINATION SYSTEM AND PROJECTION APPARATUS

(71) Applicant: Coretronic Corporation, Hsin-Chu (TW)

(72) Inventors: Kun-Liang Jao, Hsinchu (TW); Chun-Hsin Lu, Hsinchu (TW); Chun-Li Chen, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 113 days.

(21) Appl. No.: 16/565,400

(22) Filed: Sep. 9, 2019

(65) Prior Publication Data

US 2020/0089091 A1 Mar. 19, 2020

(30) Foreign Application Priority Data

Sep. 17, 2018 (CN) .......................... 201821514616.0

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2013* (2013.01); *G03B 21/2066* (2013.01)

(58) Field of Classification Search
CPC .............. G03B 21/204; G03B 21/2013; G03B 21/2066; G03B 33/08; G02B 26/008
See application file for complete search history.

(56) References Cited

U.S. PATENT DOCUMENTS

| | | | | |
|---|---|---|---|---|
| 9,897,907 B2* | 2/2018 | Hsieh | ..................... | G03B 33/08 |
| 2011/0234923 A1* | 9/2011 | Yamagishi | ........... | G03B 21/204 |
| | | | | 348/757 |
| 2013/0070205 A1* | 3/2013 | Pan | ..................... | H04N 9/3117 |
| | | | | 353/31 |
| 2013/0100417 A1* | 4/2013 | Yang | .................... | G03B 21/204 |
| | | | | 353/31 |
| 2014/0211169 A1* | 7/2014 | Kitano | ................. | H04N 9/3161 |
| | | | | 353/31 |

(Continued)

FOREIGN PATENT DOCUMENTS

CN 107783360 3/2018

*Primary Examiner* — Michelle M Iacoletti
*Assistant Examiner* — Magda Cruz
(74) *Attorney, Agent, or Firm* — JCIPRNET (57) ABSTRACT

An illumination system including a first excitation light source, a transflective element, a wavelength conversion wheel and a filter wheel is provided. The first excitation light source emits a first excitation beam. The transflective element allows a first portion beam of the first excitation beam to pass through, and reflects a second portion beam of the first excitation beam. The wavelength conversion wheel is disposed on a transmission path of the first portion beam and includes a wavelength conversion region, and when the first portion beam irradiates onto the wavelength conversion region, the first portion beam is converted into a converted beam. The filter wheel is disposed on a transmission path of the second portion beam and the converted beam, and includes multiple filter regions, wherein the second portion beam and the converted beam irradiate onto each of the filter regions of the filter wheel.

21 Claims, 6 Drawing Sheets

(56) References Cited

U.S. PATENT DOCUMENTS

| | | | |
|---|---|---|---|
| 2015/0167907 A1* | 6/2015 | Hoehmann | F21V 13/14 |
| | | | 362/84 |
| 2015/0362830 A1* | 12/2015 | Liao | G03B 21/204 |
| | | | 353/31 |
| 2016/0334695 A1* | 11/2016 | Yamada | G03B 21/2066 |
| 2018/0173087 A1* | 6/2018 | Hsieh | G03B 21/204 |
| 2018/0199013 A1* | 7/2018 | Wu | H04N 9/3158 |
| 2018/0284586 A1* | 10/2018 | Yang | G02B 26/008 |
| 2019/0179220 A1* | 6/2019 | Hu | G03B 21/2073 |
| 2020/0073219 A1* | 3/2020 | Chen | G03B 21/20 |

* cited by examiner

ILLUMINATION SYSTEM AND PROJECTION APPARATUS

CROSS-REFERENCE TO RELATED APPLICATION

This application claims the priority benefit of China application serial no. 201821514616.0, filed on Sep. 17, 2018. The entirety of the above-mentioned patent application is hereby incorporated by reference herein and made a part of this specification.

BACKGROUND OF THE INVENTION

Field of the Invention

The invention relates to an optical system and an optical apparatus, and particularly relates to an illumination system and a projection apparatus using the illumination system.

Description of Related Art

Along with development of optical technology, a solid-state lighting technique, for example, Light-Emitting Diodes (LEDs) and Laser Diodes (LDs), has been widely applied to light sources of a projector. LDs and LEDs may act as light sources of the projector to provide light beams with higher intensities.

In a laser projector, it may include a wavelength conversion wheel and a filter wheel. The wavelength conversion wheel may include a plurality of wavelength conversion regions and a wavelength non-conversion region. When the laser beams from the light source irradiate onto a plurality of the wavelength conversion regions, the laser beams may be respectively converted into a plurality of converted beams of different colors at different timings. When the laser beams irradiate onto the wavelength non-conversion region, the laser beams may be output from the wavelength non-conversion region. Finally, the converted beams and the laser beams are respectively guided to the filter wheel, and pass through corresponding filter regions respectively, so as to obtain light beams of required colors.

However, in the known framework, in order to re-guide the laser beam outputted from the wavelength conversion wheel to the filter wheel, a large amount of optical elements (reflectors, lenses, etc.) are needed and the various optical paths are required to be configured correspondingly, which may increase the overall product volume and cost.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides an illumination system and a projection apparatus, which have a simple structure and a lower cost.

Other objects and advantages of the invention may be further illustrated by the technical features broadly embodied and described as follows.

In order to achieve one or a portion of or all of the objects or other objects, an embodiment of the invention provides an illumination system. The illumination system includes a first excitation light source, a transflective element, a wavelength conversion wheel and a filter wheel. The first excitation light source is configured to emit a first excitation beam. The transflective element is disposed on a transmission path of the first excitation beam, and the transflective element allows a first portion beam of the first excitation beam to pass through and reflects a second portion beam of the first excitation beam. The wavelength conversion wheel is disposed on a transmission path of the first portion beam, and the wavelength conversion wheel includes a wavelength conversion region. When the first portion beam irradiates onto the wavelength conversion region, the first portion beam is converted into a converted beam by the wavelength conversion region. The filter wheel is disposed on a transmission path of the second portion beam reflected from the transflective element and a transmission path of the converted beam transmitted from the wavelength conversion wheel. The filter wheel includes a plurality of filter regions, and the second portion beam and the converted beam irradiate onto each of the plurality of filter regions of the filter wheel.

In order to achieve one or a portion of or all of the objects or other objects, an embodiment of the invention provides a projection apparatus. The projection apparatus includes the aforementioned illumination system, a light valve and a projection lens. The illumination system is configured to emit an illumination beam. The light valve is disposed on a transmission path of the illumination beam to modulate the illumination beam into an image beam. The projection lens is disposed on a transmission path of the image beam.

Base on the above description, in the illumination system and the projection apparatus of the invention, by the configuration of the transflective element, the first excitation beam is split into two portion beams firstly, and one of the two portion beams is transmitted to the filter wheel. Therefore, the wavelength conversion wheel of the embodiment may not include a wavelength non-conversion region, and the large amount of optical elements and the corresponding optical path configurations required for re-guiding the first excitation beam (transmitted from the wavelength conversion wheel) to the filter wheel may be omitted. Therefore, the volume, assembling time, and a mechanism assembly error may be reduced or avoided. Thus, the illumination system and the projection apparatus of the embodiment of the invention may have a simple structure and lower cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
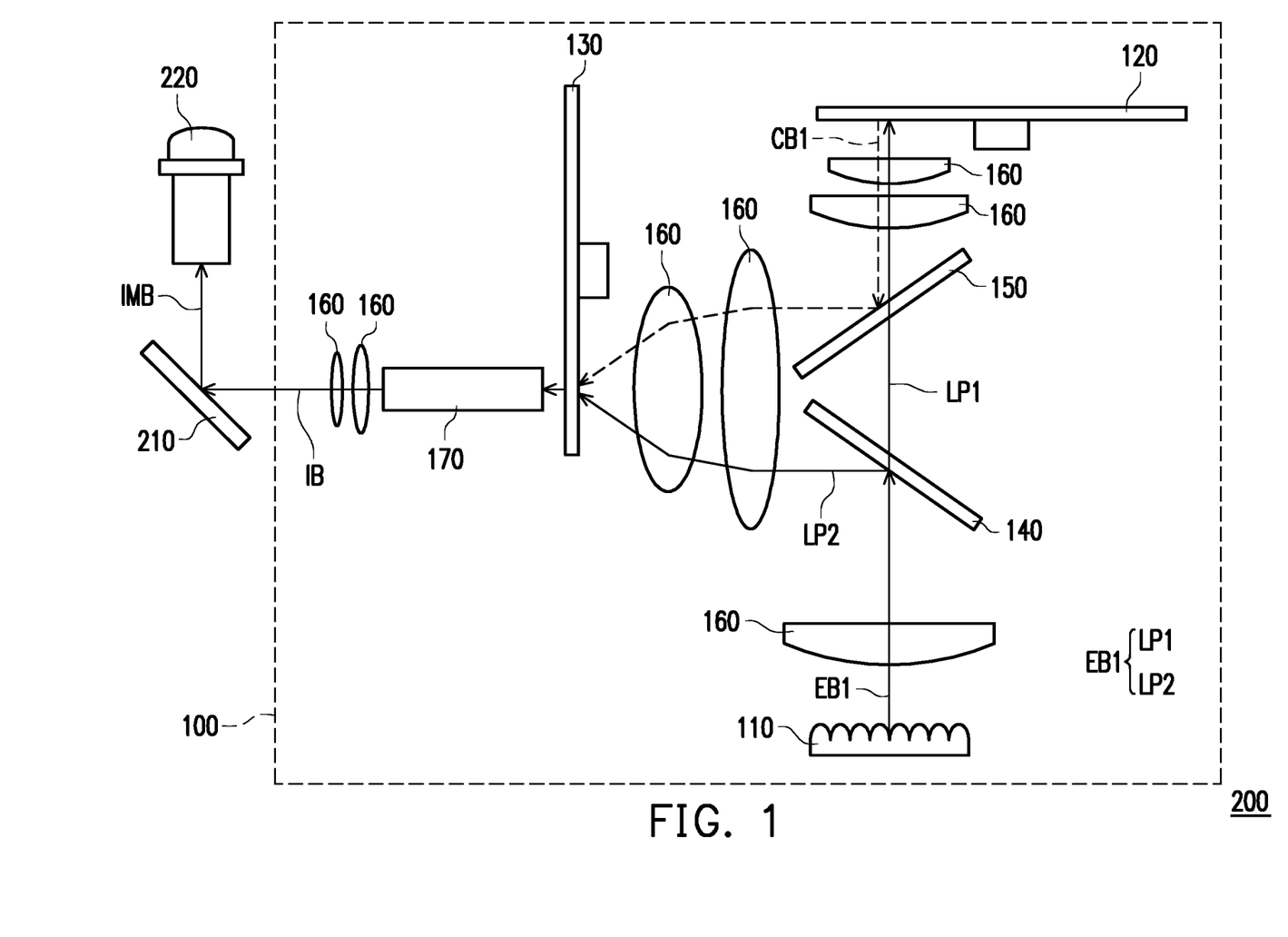
FIG. 1 is a schematic diagram of a projection apparatus according to a first embodiment of the invention.
Figure 2:
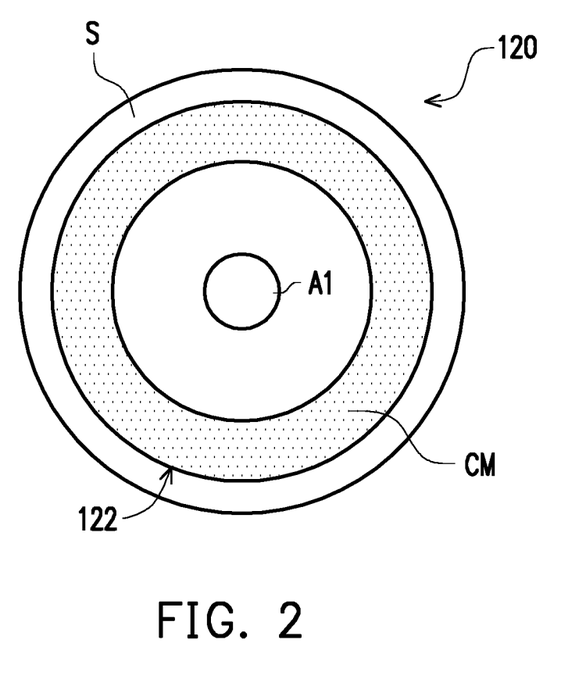
FIG. 2 is a front view of an implementation of a wavelength conversion wheel in FIG. 1.
Figure 3:
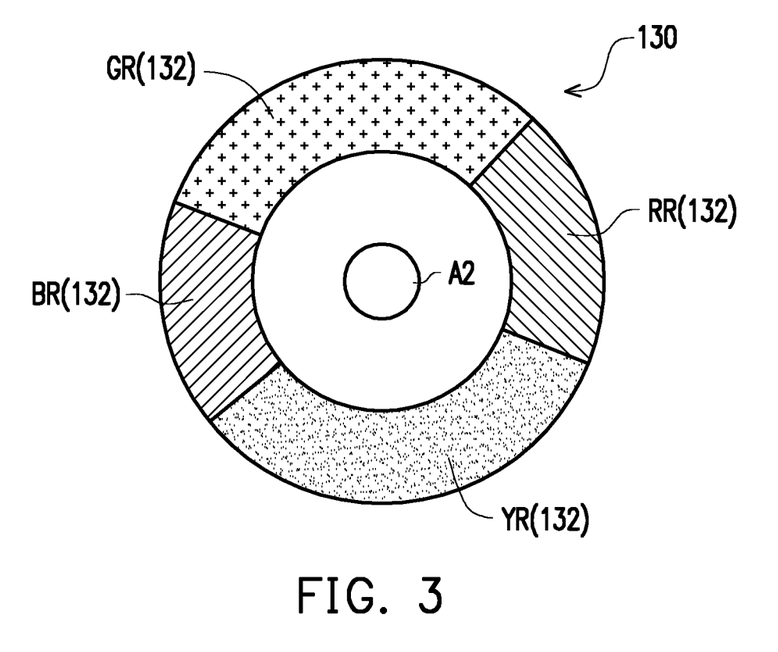
FIG. 3 is a front view of a filter wheel in FIG. 1.
Figure 4:
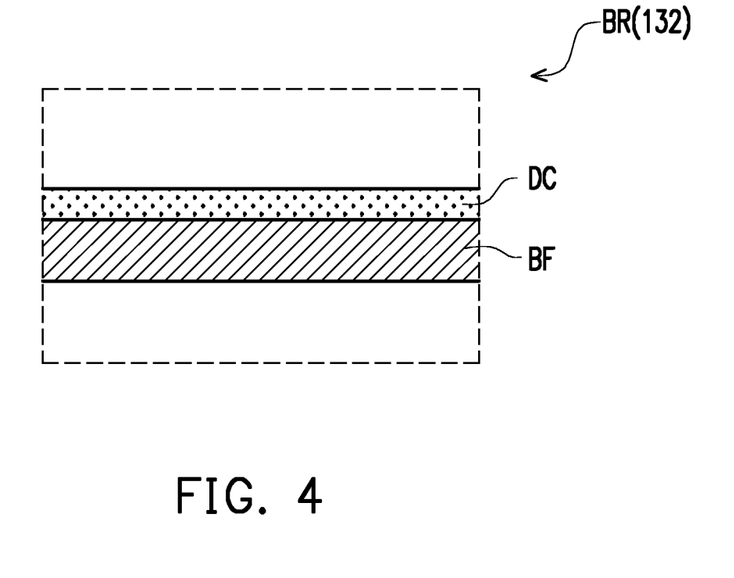
FIG. 4 is a partial cross-sectional view of a filter region for blue in FIG. 3.

FIG. 1 is a schematic diagram of a projection apparatus according to a first embodiment of the invention. FIG. 2 is a front view of an implementation of a wavelength conversion wheel in FIG. 1. FIG. 3 is a front view of a filter wheel in FIG. 1. FIG. 4 is a partial cross-sectional view of a filter region for blue in FIG. 3. Referring to FIG. 1, the projection apparatus 200 of the embodiment includes an illumination system 100, a light valve 210 and a projection lens 220. The illumination system 100 is configured to emit an illumination beam IB. The light valve 210 is disposed on a transmission path of the illumination beam IB to modulate the illumination beam IB into an image beam IMB. The projection lens 220 is disposed on a transmission path of the image beam IMB, and is configured to project the image beam IMB to a screen or a wall (not shown), so as to form an image. Since that the light valve 210 may converts the illumination beams IB of different colors sequentially into various image beams IMB after the illumination beams IB of different colors irradiates onto the light valve 210, and the light valve 210 may transmit the various image beams IMB to the projection lens 220, a colorful image may be presented after the various image beams IMB converted from the light valve 210 are projected out from the projection apparatus 200.

In the embedment, the light valve 210 is, for example, a Digital Micro-mirror Device (DMD) or a Liquid-Crystal-On-Silicon (LCOS) panel. However, in other embodiments, the light valve 210 may be a transmissive liquid crystal panel or other spatial light modulators. In the embodiment, the projection lens 220 is, for example, a combination of one or a plurality of optical lenses with a variety of refractive powers. The optical lenses, for example, may include a biconcave lens, a biconvex lens, a concavo-convex lens, a convex-concave lens, a plano-convex lens, a plano-concave lens, other non-flat lenses and a variety of combinations thereof. The form and type of the projection lens 220 are not limited by the invention.

Referring to FIG. 1, FIG. 2 and FIG. 3, the illumination system 100 includes a first excitation light source 110, a wavelength conversion wheel 120, a filter wheel 130 and a transflective element 140. The first excitation light source 110 is configured to emit a first excitation beam EB1. In the embodiment, the first excitation light source 110 generally refers to a light source adapted to emit a short wavelength beam. For example, the peak wavelength of the short wavelength beam may fall within a wavelength range of a blue light or a wavelength range of an ultraviolet light. The peak wavelength is defined as the wavelength of the light with the maximum light intensity. The first excitation light source 110 includes a Laser diode (LD), a Light Emitting Diode (LED), and an array or a group including the above. However, the invention is not limited thereto. In the embodiment, the first excitation light source 110 is a laser light emitting element including a laser diode. For example, the first excitation light source 110 is, for example, a blue laser diode bank, and the first excitation beam EB1 is a blue laser beam, though the invention is not limited thereto. In other embodiments, the first excitation light source 110 may also be a single blue laser diode.

In the embodiment, the transflective element 140 is disposed on a transmission path of the first excitation beam EB1. The transflective element 140 allows a first portion beam LP1 of the first excitation beam EB1 to pass through, and reflects a second portion beam LP2 of the first excitation beam EB1. The wavelength conversion wheel 120 is disposed on a transmission path of the first portion beam LP1, and the wavelength conversion wheel 120 includes a wavelength conversion region 122. When the first portion beam LP1 irradiates onto the wavelength conversion region 122, the first portion beam LP1 is converted into a converted beam CB1 by the wavelength conversion region 122. The filter wheel 130 is disposed on a transmission path of the second portion beam LP2 reflected from the transflective element 140 and a transmission path of the converted beam CB1 transmitted from the wavelength conversion wheel 120.

In detail, the transflective element 140 includes a multilayer stacked structure, and the multilayer stacked structure is, for example, formed by applying multiplayer films on a substrate. The substrate may include, for example, a glass material. The multilayer stacked structure is configured to separate the first excitation beam EB1 into the first portion beam LP1 and the second portion beam LP2. When the first excitation beam EB1 is transmitted to the transflective element 140, the first portion beam LP1 of the first excitation beam EB1 penetrates through the transflective element 140 and is transmitted to the wavelength conversion wheel 120. The second portion beam LP2 of the first excitation beam EB1 is reflected by the transflective element 140 and is transmitted to the filter wheel 130.

By the configuration of the transflective element 140, the first excitation beam EB1 is divided into two portion beams firstly, and one of the two portion beams is transmitted to the filter wheel 130. Therefore, the wavelength conversion wheel 120 of the embodiment may not include a wavelength non-conversion region, and the large amount of optical elements and the corresponding optical path configurations required for re-guiding the first excitation beam EB1 (transmitted from the wavelength conversion wheel 120) to the filter wheel 130 may be omitted. Therefore, the volume, assembling time and a mechanism assembly error may be reduced or avoided. Therefore, the illumination system 100 and the projection apparatus 200 of the embodiment of the invention may have a simple structure and lower cost.

Moreover, when the energy density of the light beam which irradiates onto the wavelength conversion wheel 120 is too high, the conversion efficiency of the wavelength conversion wheel 120 may probably be decreased. In the embodiment of the invention, the second portion beam LP2 of the first excitation beam EB1 is not transmitted to the wavelength conversion wheel 120, and thus the energy density of the light beam which irradiates onto the wavelength conversion wheel 120 may be lower. Therefore, the conversion efficiency of the wavelength conversion wheel 120 may be preferably maintained.

In the embodiment, the light intensity of the first portion beam LP1 is different from the light intensity of the second portion beam LP2. In detail, if the reflectivity of the transflective element 140 for a waveband range of the first excitation beam EB1 is, for example, R % and the transmittance thereof is, for example, 1−R %, the light intensity of the first portion beam LP1 is about $I_0*(1-R\%)$ and the light intensity of the second portion beam LP2 is about $I_0*R\%$, where $I_0$ is the light intensity of the first excitation beam EB1. In the embodiment, the value of R is, for example, 5-10. Namely, the reflectivity is, for example, 5%-10%, and the transmittance is, for example, 90%-95%. However, in other embodiments, the reflectivity of the transflective element 140 for the waveband range of the first excitation beam EB1 may be other values. Alternatively, the light intensity of the first portion beam LP1 may be the same as the light intensity of the second portion beam LP2, though the invention is not limited thereto.

Referring to FIG. 1 and FIG. 2, in the embodiment, the wavelength conversion wheel 120 is a rotatable disk-like element, for example, a phosphor wheel. The wavelength conversion wheel 120 converts a short wavelength beam transmitted to the wavelength conversion region 122 into a long wavelength beam. To be specific, the wavelength conversion wheel 120 includes a substrate S and a rotation shaft A1. The substrate S is, for example, a reflection substrate (a metal substrate), and the substrate S includes the wavelength conversion region 122 arranged in a ring shape. A driving element of the wavelength conversion wheel 120 drives the rotation shaft A1 to rotate, such that the wavelength conversion region 122 is rotated to be on the transmission path of the first portion beam LP1 of the first excitation beam EB1. The wavelength conversion region 122 is configured with a wavelength conversion substance CM, and the wavelength conversion substance CM is, for example, a phosphor powder for yellow. In other words, the phosphor powder for yellow is adapted to produce a yellow beam d when the excitation beam irradiates onto the phosphor powder for yellow. In the embodiment, when the wavelength conversion region 122 is rotated to be on the transmission path of the first portion beam LP1 of the first excitation beam EB1, the first portion beam LP1 is converted into the converted beam CB1 by the wavelength conversion region 122, and the converted beam CB1 is reflected by the substrate S. The converted beam CB1 is, for example, a yellow beam.

In the embodiment, a covering angle of the wavelength conversion region 122 on the wavelength conversion wheel 120 in a circumferential direction is 360 degrees, and the wavelength conversion region 122 may include only one kind of wavelength conversion substance CM (for example, the phosphor powder for yellow). Namely, the converted beam CB1 converted by the wavelength conversion wheel 120 is continuously output from the wavelength conversion wheel 120, and the color of the converted beam CB1 may not be changed at different timings. Therefore, the rotation of the wavelength conversion wheel 120 and that of the filter wheel 130 may not necessarily to be synchronized (the rotation of wavelength conversion wheel 120 and that of the filter wheel 130 are conventionally synchronized to avoid a color shift in the presented image), such that the process may be relatively simplified.

Referring to FIG. 1, FIG. 3 and FIG. 4, in the embodiment, the filter wheel 130 may be a rotatable disk-like element, for example, a color wheel. The filter wheel 130 is configured to filter out (reflect or adsorb) a beam whose wavelength falls outside a specific wavelength range and configured to allow a beam whose wavelength falls within the specific wavelength range to pass through, so as to improve the color purity of the color light and form an illumination beam IB. To be specific, the filter wheel 130 may include a plurality of filter regions 132 (for example, 4 filter regions 132 in FIG. 3) and a rotation shaft A2. A driving element of the filter wheel 130 drives the rotation shaft A2 to rotate, such that the filter regions 132 arranged in a ring shape are sequentially rotated to be on the transmission path of the second portion beam LP2 of the first excitation beam EB1 and a transmission path of the converted beam CB1. In the embodiment, the filter regions 132 are, for example, respectively a filter region for green GR, a filter region for red RR, a filter region for yellow YR and a filter region for blue BR. For example, the filter region for green GR allows a light beam within a green waveband range to pass through and filters out light beams within other waveband ranges, and the same applies to filter regions for other colors. As shown in FIG. 4, the filter region for blue BR may include a light filter for blue BF and a diffusion structure DC disposed on the light filter for blue BF. The diffusion structure DC is configured to reduce or eliminate a laser speckle phenomenon of the first excitation beam EB1. The second portion beam LP2 of the first excitation beam EB1 first passes through the light filter for blue BF, and is then transmitted to the diffusion structure DC. For example, the diffusion structure is, for example, a diffuser, a diffusion coating or diffusion microstructures disposed on the light filter for blue BF.

In the embodiment, both of the second portion beam LP2 reflected from the transflective element 140 and the converted beam CB1 transmitted from the wavelength conversion wheel 120 irradiate onto each of the filter regions 132 of the filter wheel 130. In detail, when the second portion beam LP2 of the first excitation beam EB1 is transmitted to the filter region for red RR, the filter region for yellow YR or the filter region for green GR, the second portion beam LP2 of the first excitation beam EB1 may be filtered out by the above filter regions, and when the second portion beam LP2 of the first excitation beam EB1 is transmitted to the filter region for blue BR, the second portion beam LP2 passes through the filter region for blue BR to serve as a blue beam. When the converted beam CB1 is transmitted to the filter region for red RR or the filter region for green GR, the converted beam CB1 (for example, the yellow beam) is filtered to form a red beam or a green beam. When the converted beam CB1 is transmitted to the filter region for yellow YR, the converted beam CB1 may pass through the filter region for yellow YR. When the converted beam CB1 is transmitted to the filter region for blue BR, the converted beam CB1 may be filtered out.

Referring to FIG. 1, in the embodiment, the illumination system 100 further includes a dichroic element 150. The dichroic element 150 is disposed between the transflective element 140 and the wavelength conversion wheel 120, and is located on the transmission path of the first portion beam LP1 of the first excitation beam EB1 transmitted from the transflective element 140 and the transmission path of the converted beam CB1 transmitted from the wavelength conversion wheel 120. To be specific, the dichroic element 150 may be a dichroic mirror (DM) or a beam splitting prism, and may effect differently for different beams of different colors. For example, in the embodiment, the dichroic element 150, for example allows the first excitation beam EB1 to pass through and reflects the converted beam CB1. Therefore, the dichroic element 150 may transmit the first portion beam LP1 of the first excitation beam EB1 transmitted from the transflective element 140 to the wavelength conversion wheel 120. After the first portion beam LP1 is converted into the converted beam CB1, the dichroic element 150 may transmit the converted beam CB1 (transmitted from the wavelength conversion wheel 120) to the filter wheel 130.

Moreover, the illumination system 100 further includes a plurality of lenses 160 and a light homogenizing element 170. The lenses 160 are configured to adjust an internal light path and beam collimation in the illumination system 100. The light homogenizing element 170 is configured to homogenize the second portion beam LP2 of the first excitation beam EB1 from the filter wheel 130 and transmit it to the light valve 210. In the embodiment, the light homogenizing element 170 is, for example, an integration rod or a lens array such as a fly-eye lens array, though the invention is not limited thereto.

Figure 5:
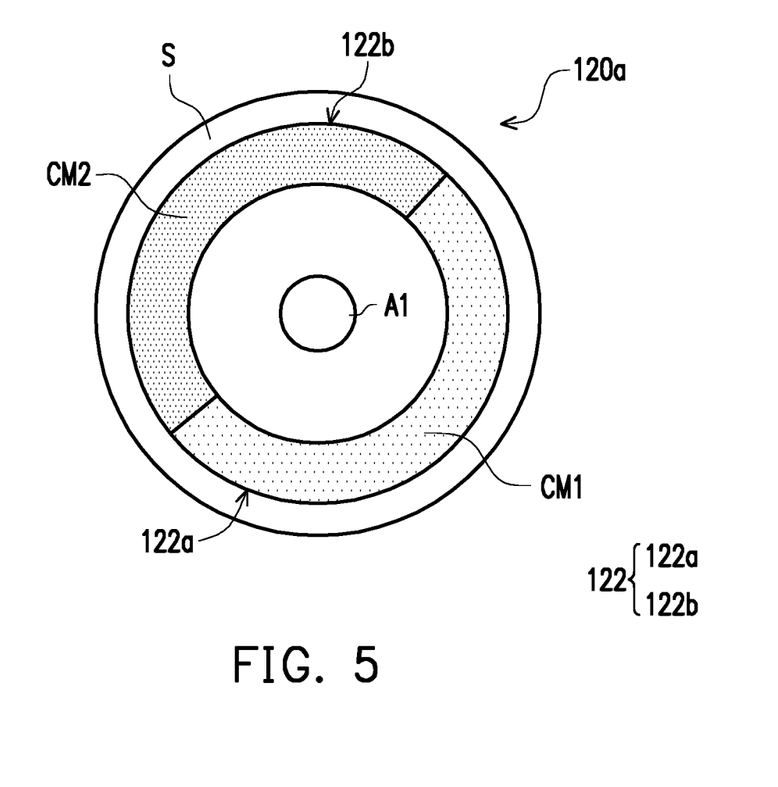
FIG. 5 to FIG. 7 are front views of other implementations of the wavelength conversion wheel of FIG. 1.
Figure 6:
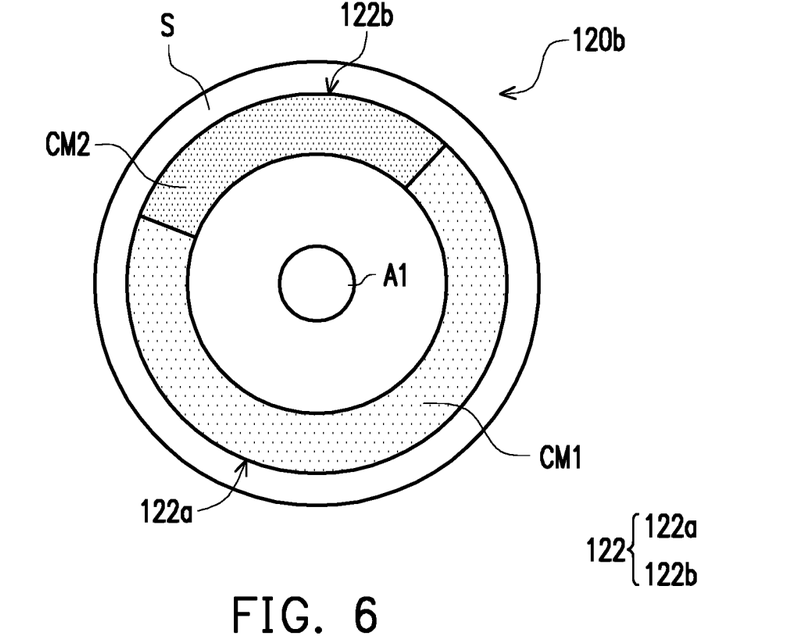
Figure 7:
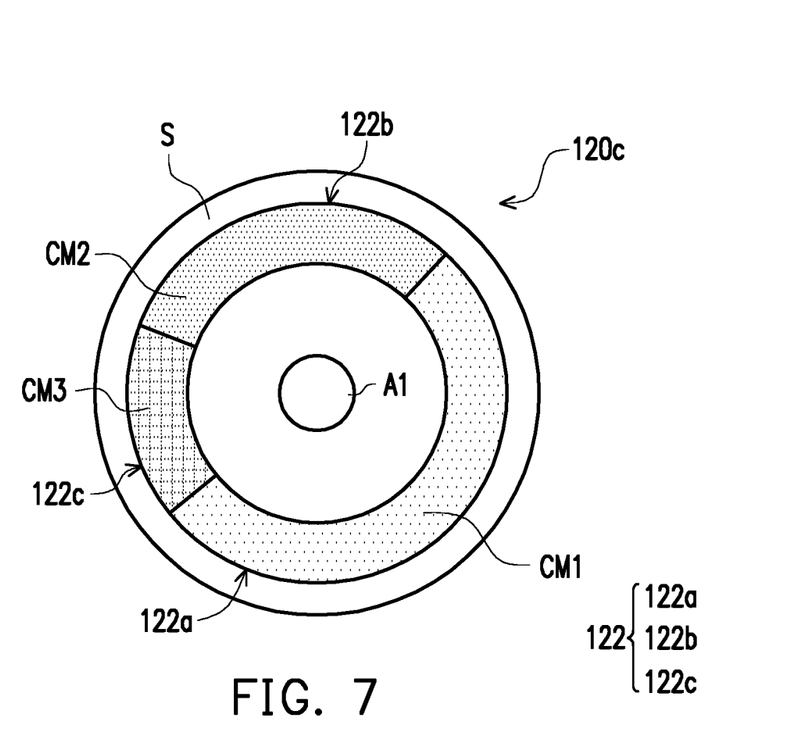

FIG. 5 to FIG. 7 are front views of other implementations of the wavelength conversion wheel of FIG. 1. Referring to FIG. 5 to FIG. 7, a main difference between the wavelength conversion wheels of FIG. 5 to FIG. 7 and the wavelength conversion wheel 120 of FIG. 1 is that the wavelength conversion regions of the wavelength conversion wheels of FIG. 5 to FIG. 7 include a plurality of wavelength conversion sub-regions, and the wavelength conversion sub-regions respectively include different kinds of wavelength conversion substances. As shown in FIG. 5 and FIG. 6, the wavelength conversion region 122 of the wavelength conversion wheel 120a or the wavelength conversion wheel 120b includes a first wavelength conversion sub-region 122a and a second wavelength conversion sub-region 122b. The first wavelength conversion sub-region 122a includes a first wavelength conversion substance CM1, and the second wavelength conversion sub-region 122b includes a second wavelength conversion substance CM2. The wavelength conversion substance CM1 is, for example, a phosphor powder for yellow, and the wavelength conversion substance CM2 is, for example, a phosphor powder for green. As shown in FIG. 7, the wavelength conversion region 122 of the wavelength conversion wheel 120c further includes a third wavelength conversion sub-region 122c, and the third wavelength conversion sub-region 122c includes a third wavelength conversion substance CM3. The wavelength conversion substance CM3 is, for example, a phosphor powder for cyan.

Referring to FIG. 3 and FIG. 5, the first wavelength conversion sub-region 122a of the wavelength conversion wheel 120a corresponds to the filter region for red RR and the filter region for yellow YR of the filter wheel 130, the second wavelength conversion sub-region 122b of the wavelength conversion wheel 120a corresponds to the filter region for green GR and the filter region for blue BR of the filter wheel 130. In detail, during a period that the first portion beam LP1 of the first excitation beam EB1 irradiates onto the first wavelength conversion sub-region 122a, the first portion beam LP1 is converted into a first converted beam by the first wavelength conversion sub-region 122a, and the first converted beam is, for example, a yellow beam. The first converted beam is sequentially transmitted to irradiate onto the filter region for red RR and the filter region for yellow YR of the filter wheel 130. The first converted beam is filtered by the filter region for red RR to form a red beam, and the first converted beam passes through the filter region for yellow YR to form a yellow beam. During a period that the first portion beam LP1 of the first excitation beam EB1 irradiates onto the second wavelength conversion sub-region 122b, the first portion beam LP1 is converted into a second converted beam by the second wavelength conversion sub-region 122b, and the second converted beam is, for example, a green beam. The second converted beam is sequentially transmitted to irradiate onto the filter region for blue BR and the filter region for green GR of the filter wheel 130. The second converted beam is filtered out by the filter region for blue BR, and the second converted beam passes through the filter region for green GR to form a green beam. In the embodiment, the converted beam CB1 includes the first converted beam and the second converted beam.

Referring to FIG. 3 and FIG. 6, the first wavelength conversion sub-region 122a of the wavelength conversion wheel 120b corresponds to the filter region for red RR, the filter region for yellow YR and the filter region for blue BR of the filter wheel 130. The second wavelength conversion sub-region 122b of the wavelength conversion wheel 120b corresponds to the filter region for green GR of the filter wheel 130. In detail, during the period that the first portion beam LP1 of the first excitation beam EB1 irradiates onto the first wavelength conversion sub-region 122a, the first portion beam LP1 is converted into the first converted beam by the first wavelength conversion sub-region 122a, and the first converted beam is, for example, a yellow beam. The first converted beam is sequentially transmitted to irradiate onto the filter region for red RR, the filter region for yellow YR and the filter region for blue BR of the filter wheel 130, and the first converted beam is filtered by the filter region for red RR to form a red beam, the first converted beam passes through the filter region for yellow YR to form a yellow beam, and the first converted beam is filtered out by the filter region for blue BR. During a period that the first portion beam LP1 of the first excitation beam EB1 irradiates onto the second wavelength conversion sub-region 122b, the first portion beam LP1 is converted into a second converted beam by the second wavelength conversion sub-region 122b, and the second converted beam is, for example, a green beam. The second converted beam irradiates onto the filter region for green GR of the filter wheel 130, and the second converted beam passes through the filter region for green GR to form a green beam. In the embodiment, the converted beam CB1 includes the first converted beam and the second converted beam.

Referring to FIG. 3 and FIG. 7, the first wavelength conversion sub-region 122a of the wavelength conversion wheel 120c corresponds to the filter region for red RR and the filter region for yellow YR of the filter wheel 130, the second wavelength conversion sub-region 122b of the wavelength conversion wheel 120c corresponds to the filter region for green GR of the filter wheel 130, and the third wavelength conversion sub-region 122c of the wavelength conversion wheel 120c corresponds to the filter region for blue BR of the filter wheel 130. In detail, during the period that the first portion beam LP1 of the first excitation beam EB1 irradiates onto the first wavelength conversion sub-region 122a, the first portion beam LP1 is converted into the first converted beam by the first wavelength conversion sub-region 122a, and the first converted beam is, for example, a yellow beam. The first converted beam is filtered by the filter region for red RR to form a red beam, and the first converted beam passes through the filter region for yellow YR to form a yellow beam. During a period that the first portion beam LP1 of the first excitation beam EB1 irradiates onto the second wavelength conversion sub-region 122b, the first portion beam LP1 is converted into the second converted beam by the second wavelength conversion sub-region 122b, and the second converted beam is, for example, a green beam. The second converted beam irradiates onto the filter region for green GR of the filter wheel 130, and the second converted passes through the filter region for green GR to form a green beam. During a period that the first portion beam LP1 of the first excitation beam EB1 irradiates onto the third wavelength conversion sub-region 122c, the first portion beam LP1 is converted into the third converted beam by the third wavelength conversion sub-region 122c, and the third converted beam is for example, a cyan beam. The third converted beam irradiates onto the filter region for blue GR of the filter wheel 130, and is filtered by the filter region for blue to form a blue beam. In the embodiment, the converted beam CB1 includes the first converted beam, the second converted beam and the third converted beam. It should be noted that a main wavelength of the third converted beam (the cyan beam) generated by the wavelength conversion substance CM3 (the phosphor powder for cyan) is greater than a main wavelength of the first excitation beam EB1.

It should be noted that reference numbers of the components and part of the aforementioned embodiment are also used in the following embodiment, where the same reference numbers may be directed to the same or similar components, and thus descriptions of the same technical contents may be omitted. The aforementioned embodiment may be referred for descriptions of the omitted parts, and detailed descriptions thereof are not repeated in the following embodiment.

Figure 8:
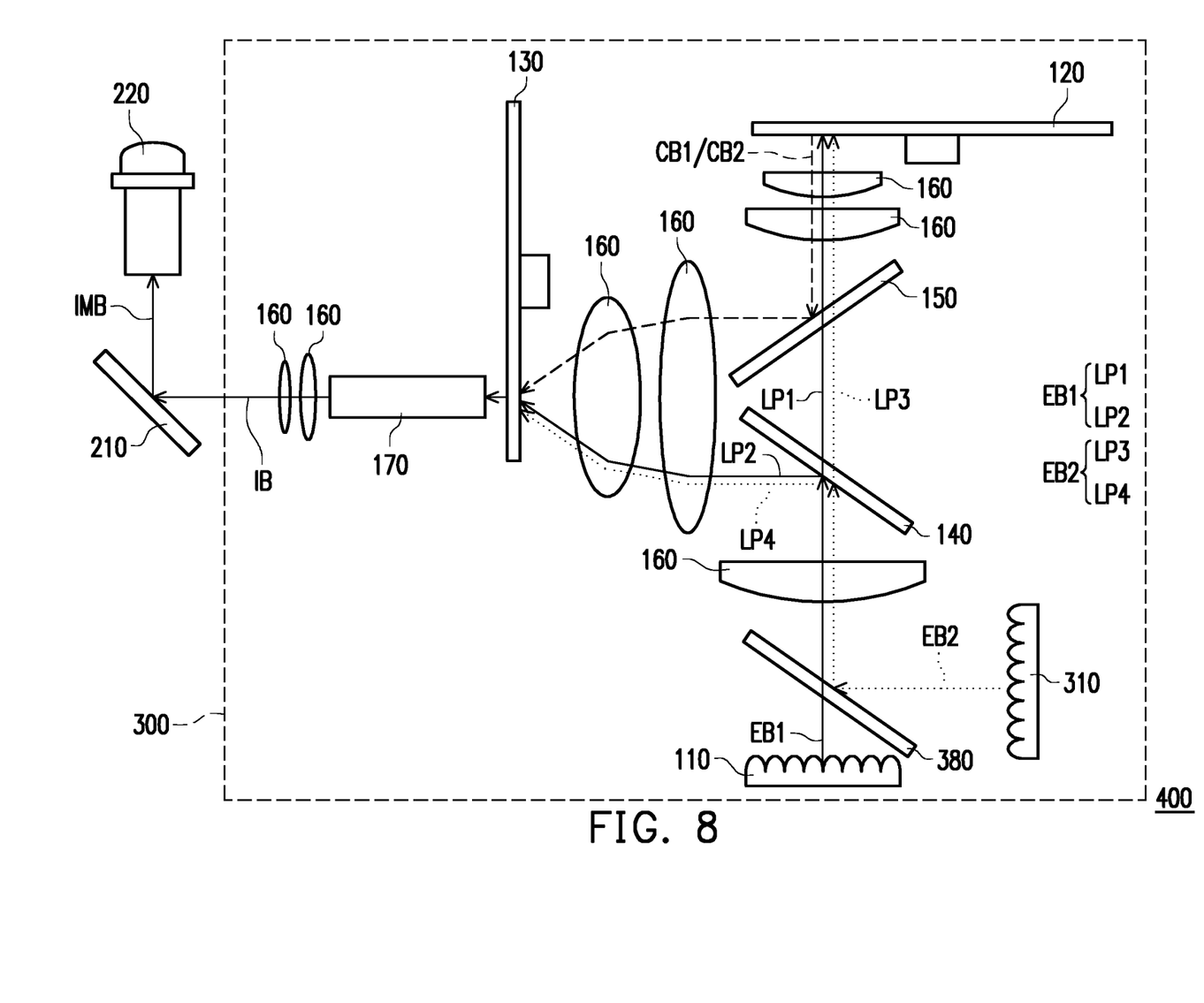
FIG. 8 is a schematic diagram of a projection apparatus according to a second embodiment of the invention.

FIG. 8 is a schematic diagram of a projection apparatus according to a second embodiment of the invention. Referring to FIG. 8, a projection apparatus 400 of the embodiment is generally similar to the projection apparatus 200 of FIG. 1. A main difference is that an illumination system 300 of the projection apparatus 400 further includes a second excitation light source 310 and an optical element 380. The second excitation light source 310 is configured to emit a second excitation beam EB2, the optical element 380 is disposed between the first excitation light source 110 and the transflective element 140, and the optical element 380 is configured to transmit the first excitation beam EB1 and the second excitation beam EB2 to the transflective element 140.

In the embodiment, the first excitation beam EB1 and the second excitation beam EB2 are respectively incident to the optical element 380. In detail, the optical element 380 includes a first portion and a second portion, where the first portion is, for example, a penetration portion (a perforation), and the second portion is, for example, a reflection portion (a reflection mirror). The first portion is disposed on the transmission path of the first excitation beam EB1 and allows the first excitation beam EB1 to pass through. The second portion is disposed on a transmission path of the second excitation beam EB2 and is configured to reflect the second excitation beam EB2, so as to transmit the first excitation beam EB1 and the second excitation beam EB2 to the transflective element 140.

In the embodiment, the second excitation light source 310 is, for example, the same as or similar to the first excitation light source 110, and a wavelength of the first excitation beam EB1 is the same as a wavelength of the second excitation beam EB2. In other embodiments, the wavelength of the first excitation beam EB1 may be different from the wavelength of the second excitation beam EB2, so as to obtain the color required by the blue beam. For example, the wavelength of the first excitation beam EB1 is, for example, 455 nm, and the wavelength of the second excitation beam EB2 is, for example, 448 nm, though the invention is not limited thereto.

As shown in FIG. 8, the transflective element 140 allows a third portion beam LP3 of the second excitation beam EB2 to pass through and reflects a fourth portion beam LP4 of the second excitation beam EB2, so as to transmit the third portion beam LP3 to the wavelength conversion wheel 120 and transmit the fourth portion beam LP4 to the filter wheel 130. A light intensity of the third portion beam LP3 is about $I_{01}*(1-R\%)$, and a light intensity of the fourth portion beam LP4 is about $I_{01}*R\%$, where $I_{01}$ is the light intensity of the second excitation beam EB2. When the third portion beam LP3 irradiates onto the wavelength conversion region 122 of the wavelength conversion wheel 120, the third portion beam LP3 is converted into a converted beam CB2 by the wavelength conversion region 122. In the embodiment, optical paths and action modes of the third portion beam LP3, the fourth portion beam LP4 and the converted beam CB2 are similar to the optical paths and action modes of the first portion beam LP1, the second portion beam LP2 and the converted beam CB1, and detailed descriptions thereof may refer to related descriptions of the first embodiment, which are not repeated.

Moreover, the wavelength conversion wheel 120 of the second embodiment may adopt the wavelength conversion wheel 120a, the wavelength conversion wheel 120b or the wavelength conversion wheel 120c shown in FIG. 5 to FIG. 7, and detailed descriptions thereof may refer to related descriptions of the first embodiment, which are not repeated.

Figure 9:
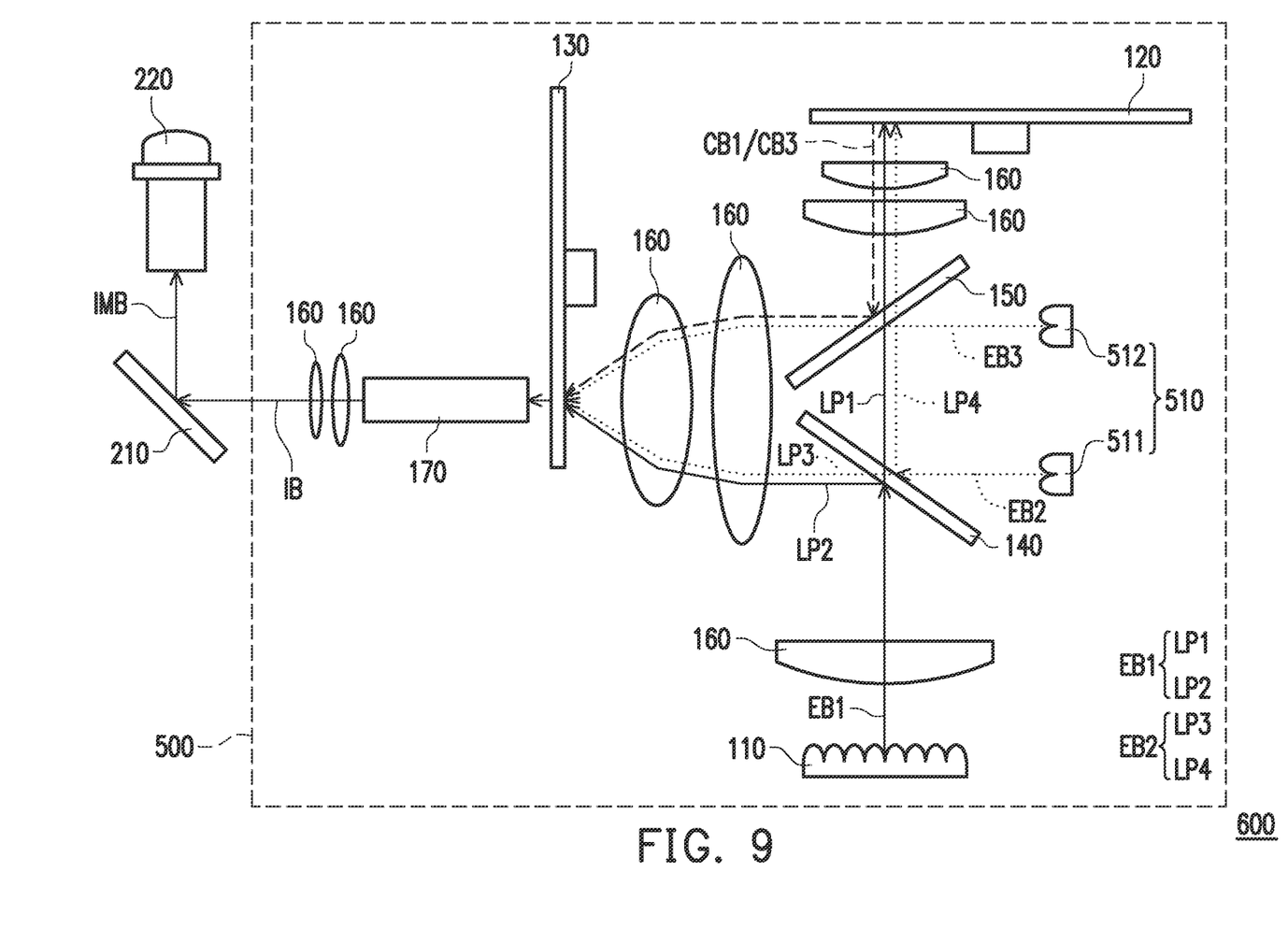
FIG. 9 is a schematic diagram of a projection apparatus according to a third embodiment of the invention.

FIG. 9 is a schematic diagram of a projection apparatus according to a third embodiment of the invention. Referring to FIG. 9, a projection apparatus 600 of the embodiment is substantially similar to the projection apparatus 200 of FIG. 1, and a main difference there between is that an illumination system 500 of the projection apparatus 600 further includes a second excitation light source 510. The second excitation light source 510, for example, includes two sub-excitation light sources 511, 512 configured respectively to emit a second excitation beam EB2 and a third excitation beam EB3. The second excitation beam EB2 is transmitted to the transflective element 140, and the third excitation beam EB3 is transmitted to the dichroic element 150.

In the embodiment, the second excitation light source 510 is, for example, the same as or similar to the first excitation light source 110, and a wavelength of the first excitation beam EB1 is the same as a wavelength of the second excitation beam EB2 and/or a wavelength of the third excitation beam EB3. In other embodiments, the wavelength of the first excitation beam EB1 may be different from the wavelength of the second excitation beam EB2 and/or the wavelength of the third excitation beam EB3, so as to obtain the color required by the blue beam. For example, the wavelength of the first excitation beam EB1 is, for example, 455 nm, the wavelength of the second excitation beam EB2 and/or the third excitation beam EB3 is, for example, 448 nm, though the invention is not limited thereto.

In the embodiment, the first excitation beam EB1 and the second excitation beam EB2 are respectively incident to the transflective element 140. As shown in FIG. 9, the transflective element 140 allows the third portion beam LP3 of the second excitation beam EB2 to pass through and reflects the fourth portion beam LP4 of the second excitation beam EB2, so as to transmit the third portion beam LP3 to the filter wheel 130 and transmit the fourth portion beam LP4 to the wavelength conversion wheel 120. A light intensity of the third portion beam LP3 is about $I_{o2}*(1-R\%)$, and a light intensity of the fourth portion beam LP4 is about $I_{o2}*R\%$, where $I_{o2}$ is the light intensity of the second excitation beam EB2. When the fourth portion beam LP4 irradiates on to the wavelength conversion region 122 of the wavelength conversion wheel 120, the fourth portion beam LP4 is converted into a converted beam CB3 by the wavelength conversion region 122. In the embodiment, optical paths and action modes of the third portion beam LP3, the fourth portion beam LP4 and the converted beam CB3 are similar to the optical paths and action modes of the second portion beam LP2, the first portion beam LP1 and the converted beam CB1, and detailed descriptions thereof may refer to related descriptions of the first embodiment, which are not repeated.

Moreover, the dichroic element 150 allows the third excitation beam EB3 to pass through, so as to transmit the third excitation beam EB3 to the filter wheel 130. The action mode of the third excitation beam EB3 at the filter wheel 130 is similar to the action mode of the second portion beam LP2 of the first excitation beam EB1 at the filter wheel 130, and detailed description thereof may refer to related description of the first embodiment, which is not repeated.

Moreover, the wavelength conversion wheel 120 of the third embodiment may adopt the wavelength conversion wheel 120a, the wavelength conversion wheel 120b or the wavelength conversion wheel 120c shown in FIG. 5 to FIG. 7, and detailed descriptions thereof may refer to related descriptions of the first embodiment, which are not repeated.

In summary, in the illumination system and the projection apparatus of the invention, by the configuration of the transflective element, the first excitation beam is split into two portion beams firstly, and one of the portion beams is transmitted to the filter wheel. When the first excitation light source is on, the second portion beam of the first excitation beam continuously irradiates onto the plurality of filter regions of the filter wheel, and the converted beam continuously irradiates onto the filter regions of the filter wheel. Therefore, the wavelength conversion wheel of the embodiment may not include a wavelength non-conversion region, and the large amount of optical elements and the corresponding optical path configurations required for re-guiding the first excitation beam (transmitted from the wavelength conversion wheel) to the filter wheel may be omitted. Therefore, the volume, assembling time, and a mechanism assembly error may be reduced or avoided. Thus, the illumination system and the projection apparatus of the embodiment of the invention may have a simple structure and lower cost. Moreover, since the blue beam includes the first excitation beam, a laser speckle phenomenon of the first excitation beam may be decreased, and thus the problem of uneven color in the image projected by the projection apparatus may be relieved. Moreover, since the second portion beam of the first excitation beam may not be transmitted to the wavelength conversion wheel, the energy density of the light beam irradiating onto the wavelength conversion wheel may therefore be reduced. Therefore, the conversion efficiency of the wavelength conversion wheel may be preferably maintained.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
a first excitation light source, configured to emit a first excitation beam;
a transflective element, disposed on a transmission path of the first excitation beam;

a wavelength conversion wheel, disposed on a transmission path of a first portion beam of the first excitation beam and comprising a wavelength conversion region, wherein when the first portion beam irradiates onto the wavelength conversion region, the first portion beam is converted into a converted beam by the wavelength conversion region, and wherein the transflective element is configured to allow the first portion beam to pass through, and simultaneously reflect a second portion beam of the first excitation beam before the first portion beam irradiates onto the wavelength conversion region; and a filter wheel, disposed on a transmission path of the second portion beam reflected from the transflective element and a transmission path of the converted beam transmitted from the wavelength conversion wheel, wherein the filter wheel includes a plurality of filter regions, and the second portion beam and the converted beam irradiate onto each of the plurality of filter regions of the filter wheel.

2. The illumination system of claim 1, wherein the transflective element comprises a multilayer stacked structure, and the multilayer stacked structure is configured to split the first excitation beam nto the first portion beam and the second portion beam.

3. The illumination system of claim 1, wherein a light intensity of the first portion beam is different from a light intensity of the second portion beam.

4. The illumination system of claim 1, wherein a covering angle of the wavelength conversion region of the wavelength conversion wheel in a circumferential direction is 360 degrees.

5. The illumination system of claim 4, wherein the wavelength conversion region includes only one kind of wavelength conversion substance.

6. The illumination system of claim 4, wherein the wavelength conversion region comprises a plurality of wavelength conversion sub-regions, and the plurality of wavelength conversion sub-regions respectively comprise different kinds of wavelength conversion substances.

7. The illumination system of claim 1, further comprising a second excitation light source and an optical element, wherein the second excitation light source is configured to emit a second excitation beam, the optical element is disposed between the first excitation light source and the transflective element and is configured to transmit the first excitation beam and the second excitation beam to the transflective element.

8. The illumination system of claim 7, wherein the optical element includes a first portion and a second portion, the first portion is configured to allow the first excitation beam to pass through, and the second portion is configured to reflect the second excitation beam.

9. The illumination system of claim 7, wherein a wavelength of the first excitation beam is different from a wavelength of the second excitation beam.

10. The illumination system of claim 7, wherein a wavelength of the first excitation beam is the same as a wavelength of the second excitation beam.

11. The illumination system of claim 1, further comprising a dichroic element disposed between the transflective element and the wavelength conversion wheel, wherein the dichroic element allows the first portion beam to pass through, so as to transmit the first portion beam to the wavelength conversion wheel, and the dichroic element reflects the converted beam transmitted from the wavelength conversion wheel, so as to transmit the converted beam to the filter wheel.

12. The illumination system of claim 11, further comprising a second excitation light source, the second excitation light source being configured to emit a second excitation beam and a third excitation beam, wherein the second excitation beam is transmitted to the transflective element, and the third excitation beam is transmitted to the dichroic element.

13. The illumination system of claim 12, wherein a wavelength of the first excitation beam is different from a wavelength of the second excitation beam or the third excitation beam.

14. The illumination system of claim 12, wherein a wavelength of the first excitation beam is the same as a wavelength of the second excitation beam or the third excitation beam.

15. The illumination system of claim 12, wherein the transflective element allows a third portion beam of the second excitation beam to pass through, so as to transmit the third portion beam to the filter wheel, and the transflective element reflects a fourth portion beam of the second excitation beam, so as to transmit the fourth portion beam to the wavelength conversion wheel.

16. The illumination system of claim 12, wherein the dichroic element allows the third excitation beam to pass through, so as to transmit the third excitation beam to the filter wheel.

17. A projection apparatus, comprising:
an illumination system, configured to emit an illumination beam and comprising:
a first excitation light source, configured to emit a first excitation beam;
a transflective element, disposed on a transmission path of the first excitation beam;
a wavelength conversion wheel, disposed on a transmission path of a first portion beam of the first excitation beam and comprising a wavelength conversion region, wherein when the first portion beam irradiates onto the wavelength conversion region, the first portion beam is converted into a converted beam by the wavelength conversion region, and wherein the transflective element is configured to allow the first portion beam to pass through, and simultaneously reflect a second portion beam of the first excitation beam before the first portion beam irradiates onto the wavelength conversion region; and
a filter wheel, disposed on a transmission path of the second portion beam reflected from the transflective element and a transmission path of the converted beam transmitted from the wavelength conversion wheel, wherein the filter wheel has a plurality of filter regions, and the second portion beam and the converted beam irradiate onto each of the plurality of filter regions of the filter wheel;
a light valve, disposed on a transmission path of the illumination beam to modulate the illumination beam into an image beam; and
a projection lens, disposed on a transmission path of the image beam.

18. The projection apparatus of claim 17, wherein the transflective element comprises a multilayer stacked structure, and the multilayer stacked structure is configured to split the first excitation beam into the first portion beam and the second portion beam.

19. The projection apparatus of claim 17, wherein a covering angle of the wavelength conversion region of the wavelength conversion wheel in a circumferential direction is 360 degrees.

20. The projection apparatus of claim 19, wherein the wavelength conversion region includes only one kind of wavelength conversion substance.

21. The projection apparatus of claim 19, wherein the wavelength conversion region comprises a plurality of wavelength conversion sub-regions, and the plurality of wavelength conversion sub-regions respectively comprise different kinds of wavelength conversion substances.

\* \* \* \* \*